US009686140B2

(12) United States Patent
Pacella et al.

(10) Patent No.: US 9,686,140 B2
(45) Date of Patent: Jun. 20, 2017

(54) INTELLIGENT NETWORK INTERCONNECT

(71) Applicants: Verizon Patent and Licensing Inc., Arlington, VA (US); Verizon Deutschland GmbH, Dortmund (DE)

(72) Inventors: Dante J. Pacella, Charles Town, WV (US); Ismat A. Pasha, Herndon, VA (US); Syed Ammar Ahmad, Ashburn, VA (US); Sven Maduschke, Mülheim (DE); Mark D. Carney, Sterling, VA (US)

(73) Assignees: Verizon Patent and Licensing Inc., Basking Ridge, NJ (US); Verizon Deutschland GmBH, Dortmund (DE)

( * ) Notice: Subject to any disclaimer, the term of this patent is extended or adjusted under 35 U.S.C. 154(b) by 140 days.

(21) Appl. No.: 14/322,285

(22) Filed: Jul. 2, 2014

(65) Prior Publication Data
US 2016/0006616 A1 Jan. 7, 2016

(51) Int. Cl.
H04L 12/24 (2006.01)
H04L 12/26 (2006.01)

(52) U.S. Cl.
CPC .......... H04L 41/0896 (2013.01); H04L 41/06 (2013.01); *H04L 43/08* (2013.01); *H04L 43/10* (2013.01)

(58) Field of Classification Search
None
See application file for complete search history.

(56) References Cited

U.S. PATENT DOCUMENTS

| 6,757,266 | B1* | 6/2004 | Hundscheidt | H04L 12/2856 370/328 |
| 6,993,686 | B1* | 1/2006 | Groenendaal | G06F 11/2023 709/224 |
| 7,123,806 | B2* | 10/2006 | Jahn | H04J 14/02 385/134 |
| 7,500,014 | B1* | 3/2009 | Jacobson | H04L 41/0677 709/239 |
| 2003/0084320 | A1* | 5/2003 | Tarquini | H04L 63/0218 726/25 |
| 2004/0122944 | A1* | 6/2004 | Poirot | H04L 41/0213 709/224 |
| 2005/0182958 | A1* | 8/2005 | Pham | G06F 21/51 726/22 |
| 2011/0022711 | A1* | 1/2011 | Cohn | G06F 9/5061 709/225 |

(Continued)

*Primary Examiner* — Xavier Szewai Wong

(57) ABSTRACT

An intelligent network interconnect may include a control channel and a plurality of nodes. The plurality of nodes may include a first node coupled to a first network and a second node coupled to a second network. Each of the plurality of nodes is coupled to the control channel. The intelligent network interconnect may also include a control device coupled to the control channel. The intelligent network interconnect may be configured to: collect network data from the first node and the second node, wherein the network data includes traffic data of the first network; obtain metrics based on the collected network data; detect an event based on the metrics and the collected network data; and a rule whose condition matches the event; and send a command over the control channel, to one or more of the nodes, to perform an action associated with the rule.

20 Claims, 10 Drawing Sheets

(56) References Cited

U.S. PATENT DOCUMENTS

| | | | |
|---|---|---|---|
| 2013/0077481 A1* | 3/2013 | Philavong | H04L 45/38 370/228 |
| 2013/0132536 A1* | 5/2013 | Zhang | H04L 41/0823 709/221 |
| 2014/0181572 A1* | 6/2014 | Bradfield | G06F 11/20 714/4.11 |

* cited by examiner

US 9,686,140 B2

INTELLIGENT NETWORK INTERCONNECT

BACKGROUND INFORMATION

A network service provider may offer a variety of communication services, such as an Internet service, email service, telephone service, texting service, Voice-over-Internet Protocol (VoIP) service, content delivery service, etc. In some instances, a service provider may offer cloud computing services. The terms "cloud" and "cloud computing" may refer, respectively, to a network for providing hosted services over the Internet (or another network) and providing hosted services by the cloud.

As service providers give greater and easier access to computational and communication resources to the general public, the service providers experience greater variations in network traffic due to factors such as denial-of-service attacks, appearance of large data sources and data sinks, etc.

DETAILED DESCRIPTION OF PREFERRED EMBODIMENTS

The following detailed description refers to the accompanying drawings. The same reference numbers in different drawings may identify the same or similar elements.

For a service provider, unpredictable movements of customers and/or services at other service providers create difficultiues in deploying and provisioning scalable, flexible network connectivity. Budgetary processes can add to the difficulties, for example, when forecasts shift or ingress/egress points change. For example, industry consolidation (such as Netflix and Akamai gaining respective marketshare), large-scale partnerships (such as Netflix and Cogent) and emergent players, such as Pinterest having a sudden growth, may cause forecasts to change and contribute to the budgetary issues.

In another example, large traffic drivers, such as Megascale Distributed Denial of Service (DDoS) attacks, Live Video or Crowdsourced Events, or large-scale natural disasters can cause traffic swings of the size and rapidity that have not been previously seen or predicted. Virtual machines and networks can move services at networks in large-scale, nearly instantaneously, altering connectivity and traffic patterns.

Partnership arrangement can impact these situations, by facilitating large traffic sources or sinks to appear behind one network one day and behind another network on another day. Much about such partnership arrangement is unknown because of the third-party relationships, until the traffic moves from one service provider to another service provider.

These problem areas point to a need for more intelligent network interconnects between networks and/or network elements. In the following description, intelligent network interconcts may provision services between partnership networks and/or allow for services and service segments to dynamically migrate within the intelligent network interconnects, to avoid stranded network assets and performance degradations.

Figure 1:
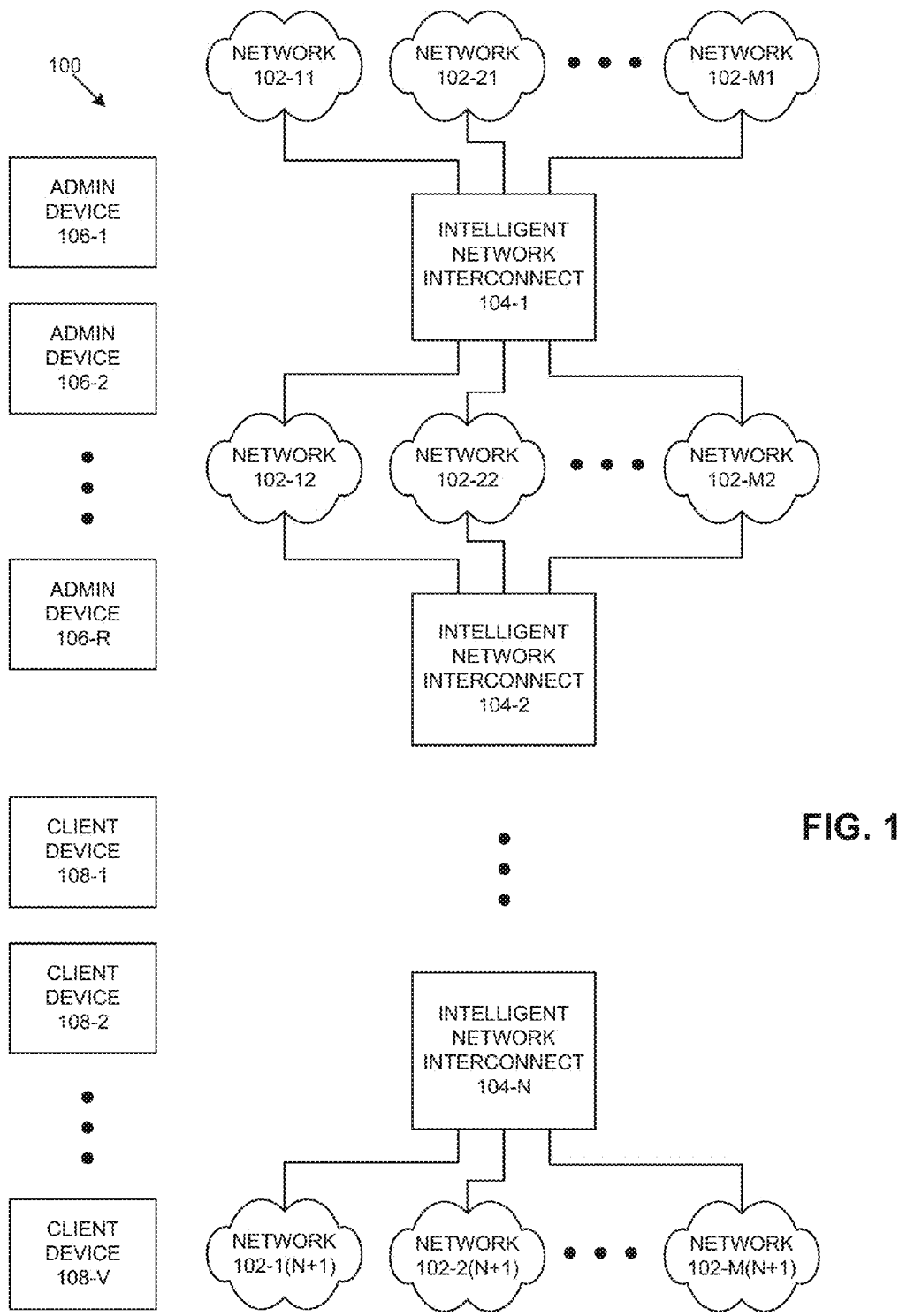
FIG. 1 illustrates an overview of an exemplary network in which concepts described herein may be implemented.

FIG. 1 illustrates an overview of an exemplary network 100 in which concepts described herein may be implemented. As shown network 100 may include N+1 groups (or "sets") of networks (N≥1), where each set of networks ranges from network 102-1 (n+1) through 102-$m$(n+1), where m and n are integers less than or equal to M and N (e.g., networks 102-11, 102-21, ... 102-M1 (M>1), 102-21, 102-22, ... 102-M2, ... and 102-M (N+1), collectively referred to as networks 102 and generically as network 102). Network 100 may also include intelligent network interconnects 104-1, 104-2, ... 104-N (collectively referred to as "intelligent network interconnects 104" and generically "intelligent network interconnect 104"), where each interconnect 104-$n$ (where n is an integer) between the two sets of networks, 102-$m$(n) and 102-$m$(n+1). Network 100 may also include administration devices 106-1 through 106-R (collectively referred to as "administration devices 106" and generically as "administration device 106") and client devices 108-1 through 108-V (collectively referred to as "client devices 108" and generically as "client device 108"). Depending on the implementation, network 100 may include fewer, additional, different, or a different arrangement of networks and/or devices than those illustrated in FIG. 1.

Network 102 may include the Internet, an intranet, a cloud network, a virtual private network (VPN), a software defined network (SDN), a service provider network, a local area network (LAN), a wide area network (WAN), a metropolitan area network (MAN), a cellular network, a public switched telephone network (PSTN), an optical network, an ad hoc network, any other type of network, or a combination of one or more networks.

In some implementaitons, network 102 may provide access to and/or provide one or more services. For example, network 102 may provide access to one or more devices within network 102. In another example, network 102 may provide content-related services (e.g., deliver content), email services, Internet services, telephone services, etc. In other implementations, network 102 may include an intranet, of an organization or an entity, that provides services (e.g., web services) to members of the organization.

Intelligent network interconnect 104 may interconnect devices in different networks 102. As shown, intelligent network 104-$n$ may interconnect devices in networks 102-$m$(n) and 102-$m$(n+1). Intelligent network interconnect 104 may include a switch, router, firewall, appliance, application server, or any combination of thereof.

In response to data collected from netwoks 102 and devices within intelligent network interconnect 104, intelligent network interconnect 104 may provide one or more services to networks 102. For example, inteligent network interconnect 104 may establish new network paths (e.g., a path in layer 1, layer 2 and/or layer 3) and/or withdraw existing network paths (e.g., a path in layer 1, layer 2, and/or layer 3) between networks 102. In some implementations, intelligent network interconnect 104 may also: establish a new service (e.g., a firewall service, mirroring service, domain name system (DNS) service, email service, etc.) for networks 102; withdraw the service for networks 102; provision a device (e.g., storage device, server device, etc.) and/or applications on behalf of one or more of networks 102; and/or de-provision the device and/or applications on behalf of networks 102. Depending on the implementations, intelligent network interconnect 104 may provide additional, fewer, or different services and/or devices than these listed above.

Administration device 106 may include an administration application (e.g., a client application or a browser) that provides a graphical user interface (GUI) to an administrator or an operator of intelligent network interconnects 104. More specifically, the administration application may receive information from intelligent network interconnects 104, present the information to an administrator, receive administrator input, and relay the administrator input to intelligent network interconnects 104.

Via an administration application, an administrator may set operational policies for intelligent network interconnects 104, set configuraiton paramters for collecting network data at intelligent network interconnects 104, configure a provisioning subsystem in intelligent network interconnects 104, configure a health management subsystem in intelligent network interconnects 104; input/remove/edit rules for rendering services (e.g., when to provision a service, application, or device) at intelligent network interconnects 104. An administration application may allow the administrator to set alarms, configure reporting services (e.g., email service, texting service, etc.), configure reporting formats, etc.

In some implementations, via an adimistration application, an administrator may allow a user to manage the account of a participating entity associated with the user (e.g., create passwords; generate billing records and/or payment records; etc.). For example, in one implementation, an adiministrator may create, via the administrator application, accounts for users that belong to a particular entity or network 102. The users may then access intelligent network interconnect 104 to request a particular service, device, etc.

Client device 108 may include a user device. The user device may include a client (e.g., a client application or a browser) that provides a GUI to a particular intelligent network interconnect 104. In some implementations, the client may allow the user to perform a subset of the functions that an administrator may perform via administration device 106.

For example, the user may request a particular intelligent network interconnect 104 to provision a new device, de-provision a device, subscribe to a service, unsubscribe from a service, manage the user's account (e.g., make a monthly paymnet), view usage information, set preferences, configure settings for receiving alarms, etc.

In some impleementations, a client on client device 106 may allow the user to set policies and/or rules for automated provisioning/de-provisioning of services and/or devices at a particular intelligent nework interconnect 104. For example, in one implementation, a user may set a rule or configuration parameters for provisioning a firewall at intelligent network interconnect 104-2. The user may request the firewall to be provisioned on a device (in intelligent network interconnect 104-2) that is logically or physically connected to a particular network address assigned to the user's device (or a device in a network with which the user is associated). The user may also specify when (or under what network conditions) the firewall is to be provisioned (e.g., when another firewall goes down; when a DDoS against the user's network is detected; etc.).

In another example, the user may set a rule or configuration parameters for modifying a network path in intelligent network interconnect 104. The user may require, for example, when the user's network is under an attack via specific paths, that a number of ports on a router on the paths be disabled, so as to reduce the router's bandwidth exposure.

Figure 2:
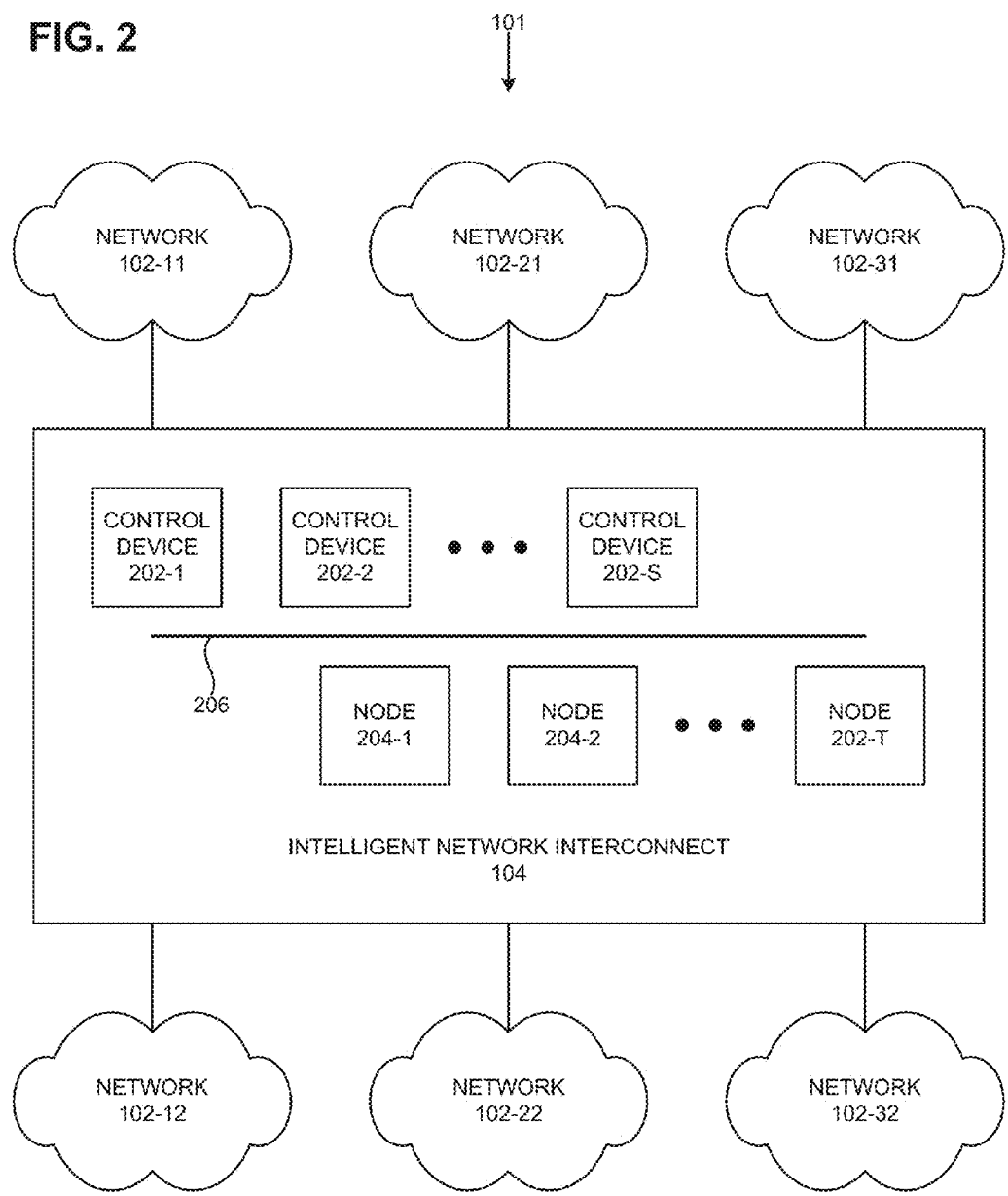
FIG. 2 illustrates a portion of the network of FIG. 1.

FIG. 2 illustrates a portion 101 of network 100 in greater detail. As shown, intelligent network interconnect 104 is connected to networks 102-11, 102-21, 102-31, 102-12, 102-22, and 102-32. As also shown, intelligent network interconnect 104 may include control devices 202-1 through 202-S (referred to collectively as "control devices 202" and generically as "control device 202"), nodes 204-1 through 204-T (referred to collectively as "nodes 204" and generically as "node 204"), and a control channel 206.

Control device 202 may provide a platform for implementing one or more subsystems in intelligent nettwork interconnect 104 for rendering services to networks 102. In some embodiments, the subsystems may be implemented on a single control device 202. In other embodiments, the subsystems may be implemented on a large number of control devices 202. In providing the services, control device 202 may use nodes 204 as resources.

Nodes 204 may include devices and/or components used for rendering services to networks 102. For example, nodes 204 may include hardware devices (e.g., services blades, network attached storage (NAS) devices, power supplies, etc.) that may be provisioned by control devices 202, in order to migrate a particular service from one portion of an intelligent network interconnect 104 to another portion of the intelligent network interconnect 104.

Control channel 206 may include communiation paths or links (in-band or out-of-band) for control devices 202 to communiate with nodes 204. Via control channel 206, control devices 202 may collect network data from nodes 204 (e.g., health statuses of nodes 204, traffic data, bandwidth use, etc.). In addition, control devices 202 may send commands for controlling nodes 204 via control channel 206. In some embodiments in which nodes 204 include clusters, control channel 206 may provide paths for heartbeats between the members of each cluster.

In FIG. 2, portion 101 may include wired, optical, and/or wireless connections among the devices and the network illustrated. A connection may be direct or indirect and may involve an intermediary device and/or an intermediary network not illustrated in FIG. 1 and/or FIG. 2. Additionally, the number, type (e.g., wired, wireless, etc.), and the arrangement of connections between the devices and the network are exemplary.

A device or node may be implemented according to a centralized computing architecture, a distributed computing architecture, or a cloud computing architecture (e.g., an elastic cloud, a private cloud, a public cloud, etc.). Additionally, a device may be implemented according to one or multiple network architectures (e.g., a client device, a server device, a peer device, a proxy device, and/or a cloud device).

The number of devices, the number of networks, and the configuration in portion 101 are exemplary. According to other embodiments, portion 101 may include additional devices, fewer devices, and/or differently arranged devices, than those illustrated in FIG. 2. For example, a single device in FIG. 2 may be implemented as multiple devices and/or multiple devices may be implemented as a single device. For example, control device 202-1 may be implemented as multiple devices, such as a computer and an external storage device, and nodes 204 may be combined into a single device. Additionally, or alternatively, portion 101 may include an additional network and/or a differently arranged network, than that illustrated in FIG. 2. For example, portion 101 may include an intermediary network. Also, according to other embodiments, one or more functions and/or processes described as being performed by a particular device may be performed by a different device, or some combination of devices.

Figure 3:
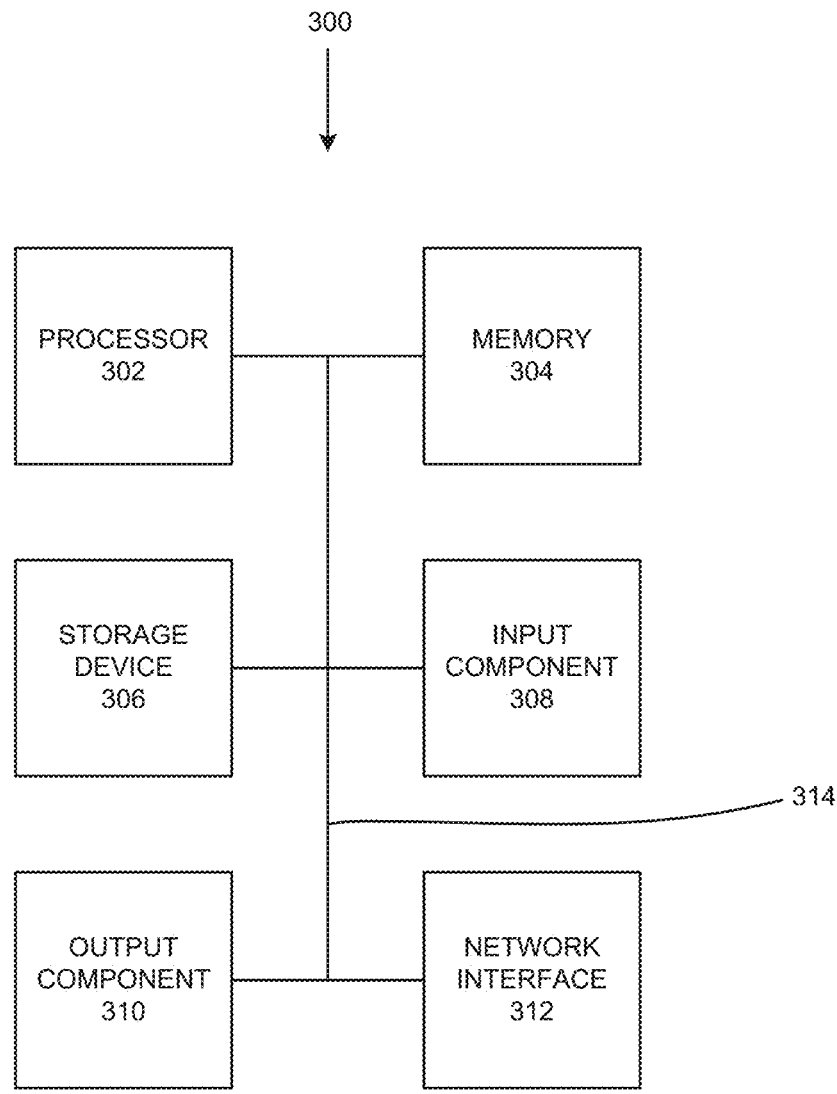
FIG. 3 illustrates exemplary components of network devices of FIGS. 1 and 2.

FIG. 3 is a block diagram of exemplary components of a network device 300. Network device 300 may correspond to any of the devices illustrated in network 100 (e.g., devices in networks 102, intelligent network interconnects 104, administration device 106, and client device 108) and network portion 101 (e.g., control devices 202 and nodes 204). As shown, network device 300 may include a processor 302, memory 304, storage unit 306, input component 308, output component 310, network interface 312, and communication path 314. In different implementations, network device 300 may include additional, fewer, different, or different arrangement of components than the ones illustrated in FIG. 3. For example, network device 300 may include line cards for connecting to external buses.

Processor 302 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), microcontrollers, and/or other processing logic (e.g., embedded devices) capable of controlling device 300 and/or executing programs/instructions.

Memory 304 may include static memory, such as read only memory (ROM), and/or dynamic memory, such as random access memory (RAM), or onboard cache, for storing data and machine-readable instructions (e.g., programs, scripts, etc.).

Storage unit 306 may include a floppy disk, CD ROM, CD read/write (R/W) disk, optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Storage unit 306 may be external to and/or removable from network device 300. Storage unit 306 may include, for example, a Universal Serial Bus (USB) memory stick, a dongle, a hard disk, off-line storage, a Blu-Ray® disk (BD), etc. Storage unit 306 may store data, a copy of software, an operating system, application, and/or instructions.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 308 and output component 310 may provide input and output from/to a user to/from device 300. Input/output components 308 and 310 may include a display screen, a keyboard, a mouse, a speaker, a microphone, a camera, a DVD reader, USB lines, and/or other types of components for converting physical events or phenomena to and/or from signals that pertain to device 300.

Network interface 312 may include a transceiver (e.g., a transmitter and a receiver) for network device 300 to communicate with other devices and/or systems. For example, via network interface 312, network device 300 may communicate over a network, such as the Internet, an intranet, a terrestrial wireless network (e.g., a WLAN, WiFi, WiMax, etc.), a satellite-based network, optical network, etc. Network interface 312 may include a modem, an Ethernet interface to a LAN, and/or an interface/connection for connecting device 300 to other devices (e.g., a Bluetooth interface).

Communication path 314 may provide an interface through which components of device 200 can communicate with one another.

Network device 300 may perform the operations described herein in response to processor 302 executing software instructions stored in a non-transient computer-readable medium, such as memory 304 or storage device 306. The software instructions may be read into memory 304 from another computer-readable medium or from another device via network interface 312. The software instructions stored in memory 304 or storage device 306, when executed by processor 302, may cause processor 302 to perform processes that are described herein.

Figure 4:
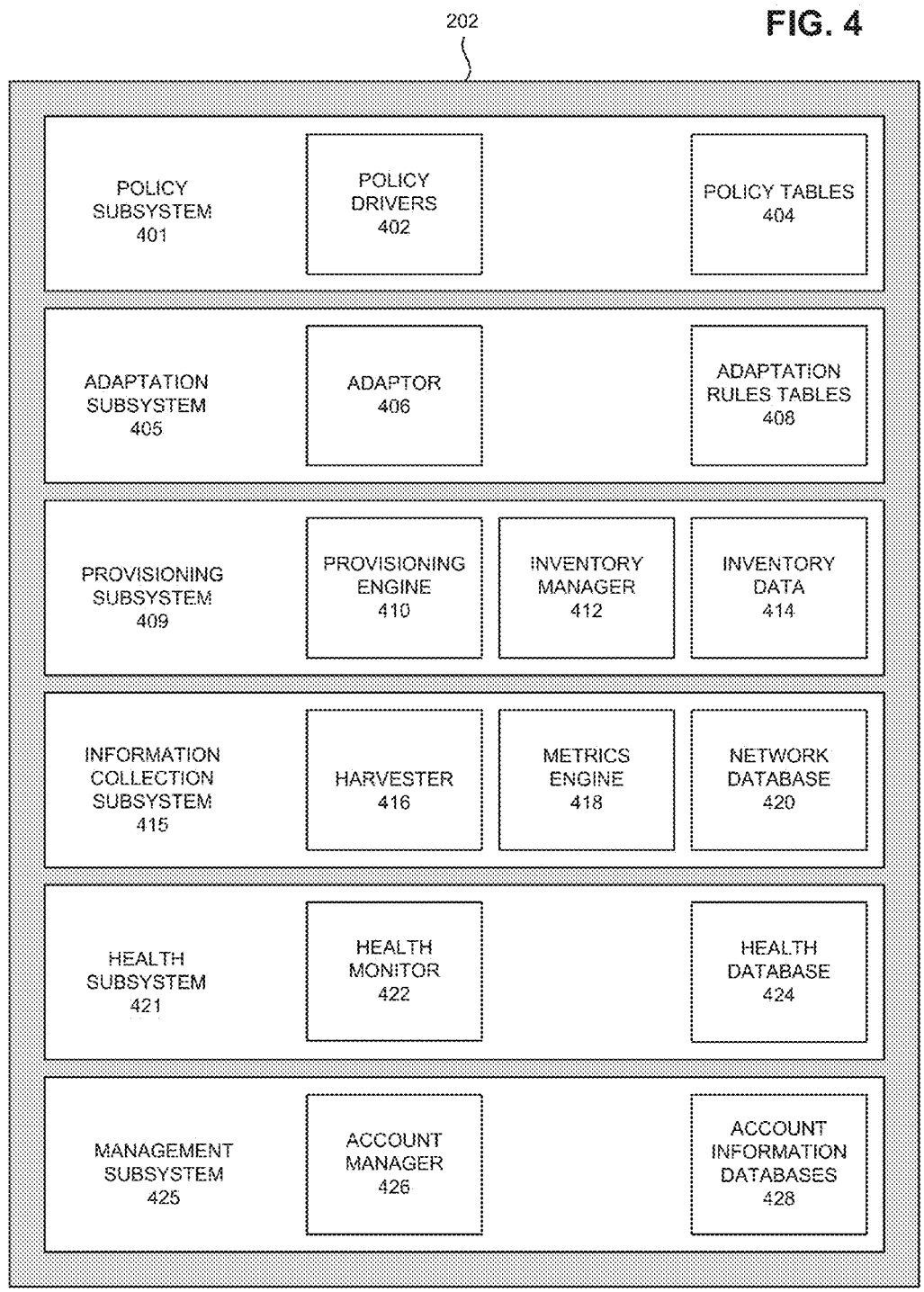
FIG. 4 illustrates exemplary functional components of an exemplary control device of FIG. 2.

FIG. 4 illustrates exemplary functional components of exemplary control devices 202. As shown, control devices 202 may include a policy subsystem 401, adaptation subsystem 405, provisioning subsystem 409, information collection subsystem 415, health subsystem 421, and management subsystem 425.

Policy subsystem 401 may receive policies from administrators and/or users, via an administration application and/or a client installed on, respectively, administration device 106 and/or client device 108. As shown in FIG. 4, policy subsystem 401 may include policy drivers 402, which enforce the policies in policy tables 404, and policy tables 404, which store policies received from the administrators and/or users. Depending on the embodiment, a user or an administrator may also edit the policies in tables 404 or remove the policies from tables 404 via the client or the administration application.

Each policy in policy tables 404 may include a rule that applies to other types of rules for adapting intelligent network interconnect 104 to external events. For example, assume that intelligent network interconnect 104 uses two rules for modifying intelligent network interconnect 104: (1) a rule for modifying network paths through intelligent network interconnect 104-1 when a path from network 102-11 to 102-21 becomes congested with malicious packets; and (2) a rule for modifying network paths through intelligent network interconnect 104-1 when a path from network 102-12 to 102-22 becomes congested with malicious packets. Also, assume that intelligent network interconnect 104-1 is unable to apply both rules (1) and (2) at desired bandwidths, due to resource constraints, and that networks 102-12 and 102-22 are subscribed to a higher quality of service (offered by intelligent network interconnect 104-1) than networks 102-11 and 102-21. A policy for such a situation may require that a rule applicable to networks subscribed to higher quality of service takes precedence over a rule applicable to networks subscribed to lower quality of service.

Adaptation subsystem 405 may receive rules for modifying intelligent network interconnect ("adaptation rules") from administrators and/or users via an administration application or a client installed on, respectively, administration device 106 and client device 108. As shown in FIG. 4, adaptation subsystem 405 may include adaptor 406, which applies rules in adaptation rules tables 408, and adaptation rules tables 408, which store rules received from the administrators or users. Depending on the implementation, a user or an administrator may also edit or remove adaptation rules via the client or the administration application.

Each adaptation rule in table 408 may prescribe specific actions, for intelligent network interconnect 104, given specific event(s) in networks 102. For example, an adaptation rule may prescribe: shunting a particular network path or withdrawing a route when intelligent network interconnect 104 detects a DDoS attack from one of networks 102. In another example, an adaptation rule may prescribe provisioning a physical device or a virtual machine to host an application, firewall, content server, etc., within intelligent network interconnect 104. In enforcing a rule, adaptor 406 may issue a set of commands to provisioning subsystem 409.

Provisioning subsystem 409 may include a provisioning engine 410, inventory manager 412, and inventory data 414. Provisioning engine 410 may schedule or execute requests for provisioning assets from policy drivers 402 and/or adaptor 406. As used herein, the term "asset" may refer to a device, software, a component, and/or resource that may be provisioned, such as bandwidth, a network path, an application, a server device, etc. In provisioning an asset, provisioning engine 410 may request inventory manager 412 to determine whether resources are available to fulfill the provisioning request; and if so, send a request to inventory manager 412 to commit the resources. Thereafter, provisioning engine 410 may schedule a sequence of actions in order to provision the asset.

In some implementations, depending on policies in policy tables 404, when provisioning engine 410 determines that there is not enough resources available to provision a new asset, provisioning engine 410 may determine whether the new asset may be provisioned by first de-provisioning an old asset, to free up the resources used to provisioned the old asset. If a cost associated with de-provisioning the old asset is less than the benefit from provisioning the new asset, provisioning engine 410 may de-provision the old asset and return the resources of the old asset to the inventory. Provisioning engine 410 may then reuse the freed resources to provision the new asset. If the cost is greater than the benefit, provisioning engine 410 may abort the attempt to provision the new asset, and notify either the administrator or the user.

Inventory manager 412 may track intelligent network interconnect 104's inventory of resources for provisioning assets. If new resources are added to the inventory, inventory manager 412 may record the additions in inventory data 414 (e.g., added by an engineer, automatically added when an old asset is de-provisioned, etc.). Similarly, if resources are used to provision a service or a device, inventory manager 412 may record, in inventory data 414, that the resources have been used.

In addition to tracking new resources or returned resources in the inventory, inventory manager 412 may also provide the following information to another system or a component (e.g., a software module): (1) cost/benefit that is associated with an existing asset; (2) a list of resources used to provision an asset; (3) a list of unused resources in intelligent network interconnect 104; and/or (4) a list of assets whose cost is less than a specified benefit. Such information may be used by the requesting component (e.g. adaptor 406 or policy drivers 402). For example, in one implementation, adaptor 406 may use cost/benefit information from inventory manager 412 to determine whether to provision a particular service or device.

Inventory manager 412 may be capable of reserving resources that are to be used for provisioning a new asset. Reserving a set of resources may "lock" the set of resources, so that the set of resources may not be used to provision another asset. Similarly, inventory manager 412 may lock an asset, such that the asset cannot be de-provisioned.

Inventory data 414 may include databases or tables of records. Each record may include information that uniquely identifies, for example: a component; assignable IP address; a piece of software or an application; an operation system; a piece of memory (e.g., network attached storage (NAS)); a processing unit; network interface; a virtual machine; a honeypot; a router; assignable port; assignable bandwidth; etc., or another resource in intelligent network interconnect 104. As described above, inventory manager 412 may access and/or modify inventory data 414. In some implementations, a user or administrator may access and/or modify inventory data 414, via, for example, a client or an administration application.

Information collection subsystem 415 may include a harvester 416, metrics engine 418, and network database 420. Harvester 416 may receive network data from nodes 204 that are connected to networks 102. The network data may include, for example, Simple Network Management Protocol (SNMP) data (e.g. CPU usage/load, traffic for each port, etc.); Packet Sniffing data; NetFlow, sFlow, or jFlow data; etc.

In some implementations, harvester 416 may receive network data from agents that are installed on nodes 204. The agents may be configured via an administration application to collect and to send specific types of data to harvester 416.

Metrics engine 418 may generate network statistics based on data, collected by harvester 416 and stored in network database 420. Metrics engine 418 may calculate, for example, total traffic from one network 102 to another network 102 over specified time periods, storage usages, CPU usages, etc. Metrics engine 418 may provide the statistics to adaptor 406 or to policy drivers 402, which may detect conditions or events for triggering a particular policy/ rule. Network database 420 may include data collected by harvester 416, as well as statistics output from metrics engine 418.

Health subsystem 421 may include health monitor 422 and health database 424. Health monitor 422 may collect health data and store the data in health database 424. Health database 424 may store health data on behalf of another component (e.g., health monitor 422) or retrieve information on behalf of another component (e.g., policy drivers 402, adaptor 406, health monitor 422, etc.).

In some embodiments, policy tables 404/adaptation rules 408 may include rules for managing the health of intelligent network interconnect 104 (e.g., when to provide redundancy, generate alarms, etc.). Policy drivers 402 and/or adaptor 406 may then respond to detected changes in health statuses of devices/components in intelligent network interconnect 104. In other embodiments, health subsystem 421 may include components that are separate from policy subsystem 401 and adaptation subsystem 405, for taking actions in response to changes in health statuses of the devices in intelligent network interconnect 104.

Intelligent network interconnect 104 may be configured to handle network faults, and device failures. For example, in some embodiments, intelligent network interconnect 104 may include clusters. When one of the devices in a cluster fails, policy drivers 402 and/or adaptor 406 may generate an alarm; or automatically reconfigure another device to replace the failed device within the cluster.

Management subsystem 425 may include am account manager 426 and account information databases 428. Account manager 426 may communicate with administration applications and/or clients on administration devices 106 and/or client devices 108 to: set user preferences; subscribe to a specific service; unsubscribe from a service; pay bills; and/or perform other administrative functions.

Account information databases 428 may include information such as billing/payment history, user IDs/passwords, preferences for each user ID, problem reports, etc.

Depending on the implementation, control devices 202 may include additional, fewer, different, or a different arrangement of subsystems and/or components within the subsystems than those illustrated in FIG. 4. For example, components in FIG. 4 may provide for application programming interfaces (APIs) for external applications or network controllers, such as Software Defined Networking (SDN) controllers (e.g., to create new services using service chaining). Also, depending on the implementation, the subsystems and/or the components may be distributed over multiple control devices 202.

Figure 5:
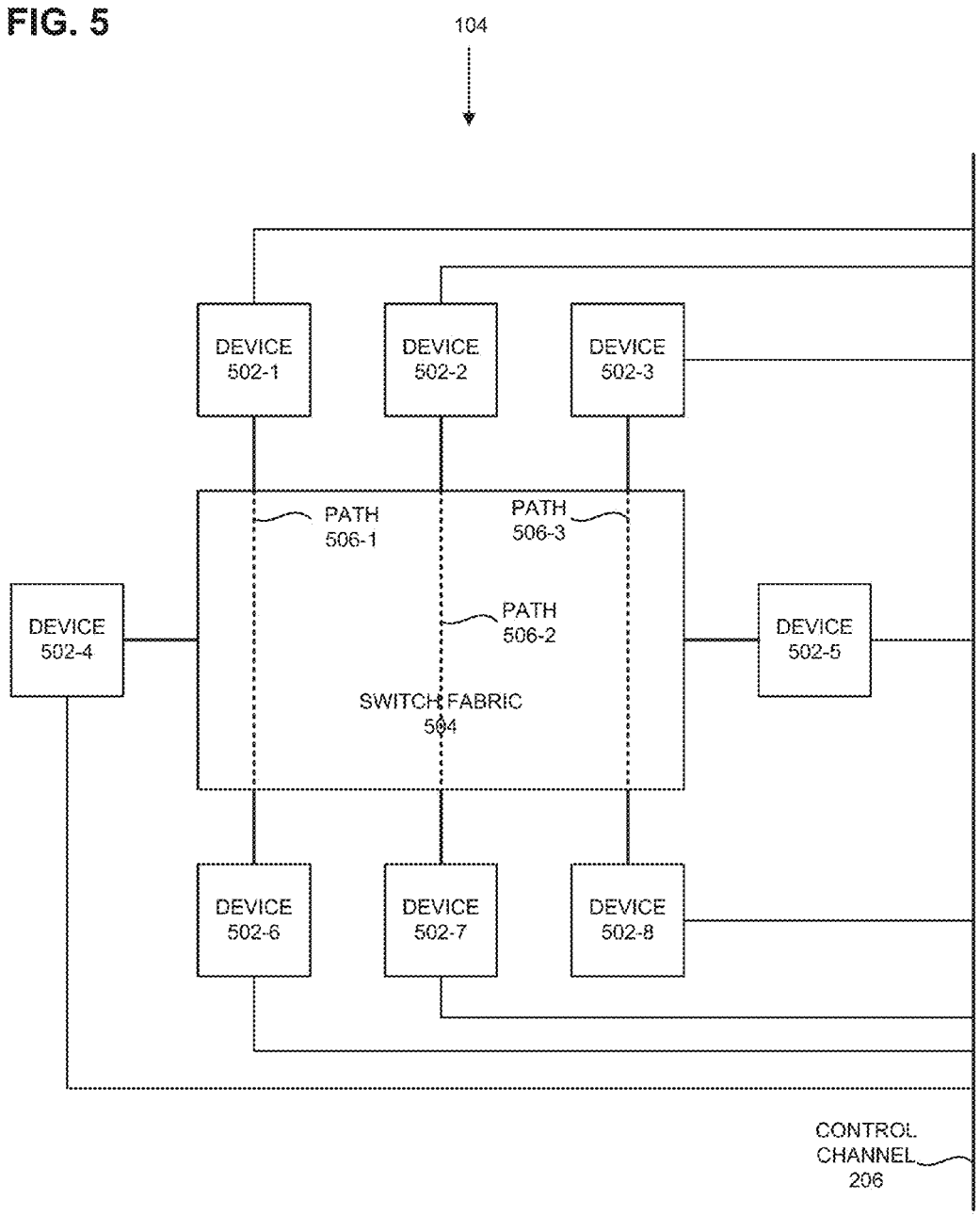
FIG. 5 illustrates a set of paths, through an intelligent network interconnect of FIG. 1, that interconnect devices in the networks of FIG. 1.

FIG. 5 illustrates a set of paths, through an intelligent network interconnect 104, that interconnect devices in networks 102. In FIG. 5, devices 502-1 through 502-8 (collectively referred to as "devices 502" and generically as "device 502") are located within intelligent network interconnect 104 and directly couple to networks 102.

As shown, intelligent network interconnect 104 includes a switch fabric 504 that provides a path 506-1 between devices 502-1 and 502-6, a path 506-2 between devices 502-2 and 502-7, and a path 506-3 between devices 502-3 and 502-8. Each of the devices 502 is coupled to control channel 206. In different implementations, devices 502 may be interconnected to one another by devices/components different from switch fabric 504.

Figure 6:
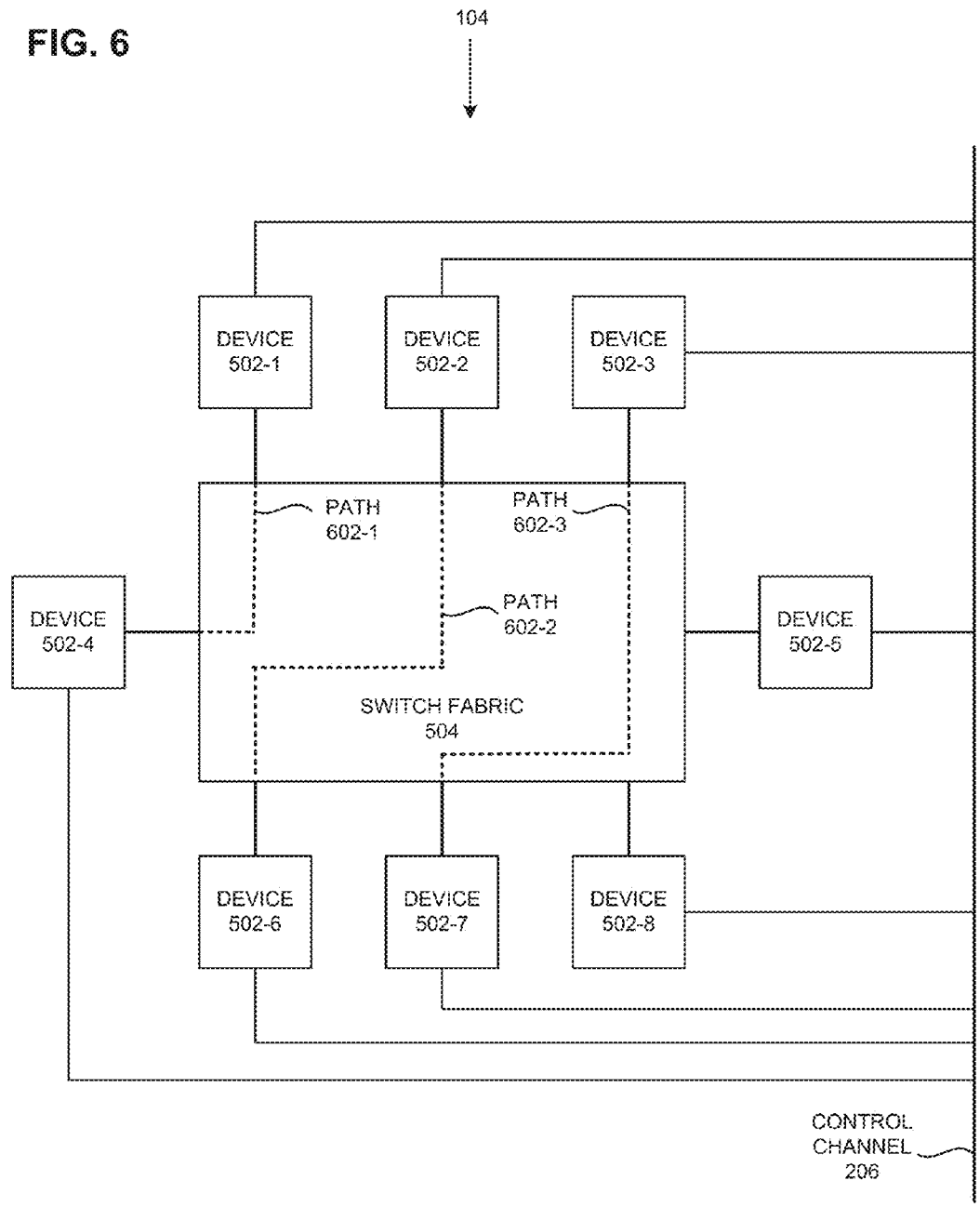
FIG. 6 illustrates another set of paths, through the intelligent network interconnect of FIG. 1, that interconnect devices in the networks of FIG. 1.

FIG. 6 illustrates another set of paths, through intelligent network interconnect 104, that interconnect devices 502. As shown, switch fabric 504 now provides a path 602-1 between devices 502-1 and 502-4, a path 602-2 between devices 502-2 and 502-6, and a path 602-3 between devices 502-3 and 502-7. Paths 602-1, 602-2, and 602-3 may be the result of directed path shunts in real time, shifting detected/monitored bandwidth usage.

In FIG. 6, device 502-4 may host a service spun up to meet an overflow need, such as a need arising from a particular DDoS vector. In one implementation, the DDoS vector may stem from an Internet-wide Network Time Protocol (NTP) with a small ambient network load. During an attack, traffic normally measured in 10 kilobits per second (Kbps) between networks can, within minutes, turn into traffic measured in 100 gigabits per second (Gbps). In response, intelligent network interconnect 104 may build the shunt illustrated in FIG. 6, directing the NTP packets to flow from device 502-1 to device 502-4. Device 502-4 may then push the traffic back to intelligent network interconnect 104 and to device 502-8, which may have more idle bandwidth to handle the traffic. Control traffic, such as Border Gateway Protocol (BGP) traffic or Multicast Source Discovery Protocol (MSDP) traffic may remain unaffected during the shunt. Depending on the embodiment, the shunt may be programmed in one of many ways. For example, the shunt may be programmed via OpenFlow (e.g., a standard that enables remote management of traffic forwarding) or by floating the advertised next-hop. The latter approach may be useful if all traffic through the next hop is shunted.

In some situations, intelligent network interconnect 104 may spin up a firewall in front of device 502-4. In response, a routing instance may be created on device 504-2 so as to share its state with device 502-6, over control sessions. Alternatively, device 502-4 may host a standalone service without routing or a firewall if the service provides a pre-filtering/pass-through/proxy function. Intelligent network interconnect 104 may use a flow table to protect the service, by allowing only packets that match the flow criteria.

In another example, intelligent network interconnect 104 may position a proxy in front of a device 502. The proxy may look for matching patterns in packets, e.g., for filtering. For example, nodes 204 in network interconnect 104 may filter NTP packets with MONLIST queries (i.e., queries for requesting a list of hosts that connected to an NTP server), as typical routers or switches are not well-suited for filtering traffic by examining application-level data. The proxy that is front-ending the service may examine options, lengths, or other application criteria, discard any spurious traffic, and pass only valid traffic. In some implementations, intelligent network interconnect 104 may use such proxies to mitigate a DDoS attack.

Intelligent network interconnect 104 may use other methods to handle unexpected demands on a content delivery network (CDN) service, domain name system (DNS) service, or other services. If intelligent network interconnect 104 provides such services, intelligent network interconnect 104 may reposition the services to match bandwidth/demand (i.e., provision the service at a particular network location to match the demand and de-provision the service when the demand normalizes).

Figure 7:
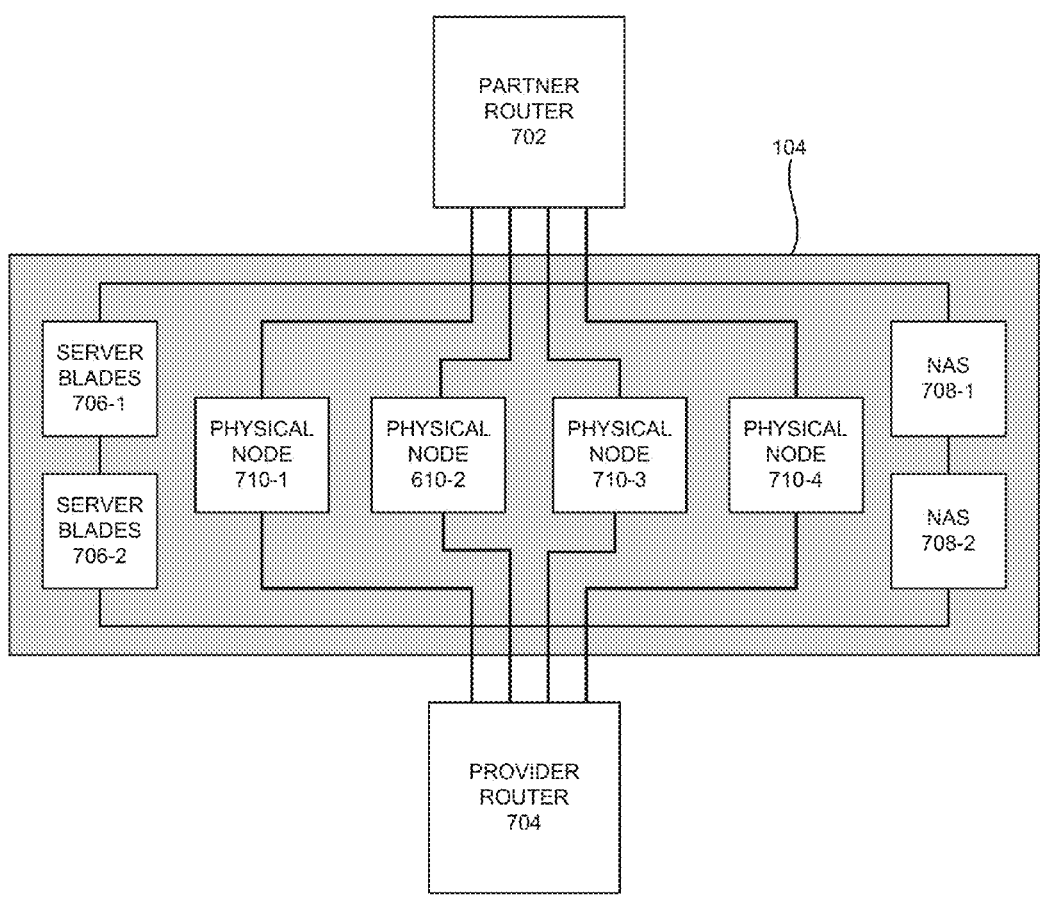
FIG. 7 illustrates exemplary devices in an intelligent network interconnect of FIG. 1 according to one implementation.

FIG. 7 illustrates exemplary devices in an intelligent network interconnect 104 according to one implementation. As shown, intelligent network interconnect 104 may include services blades 706-1 and 706-2, NASs 708-1 and 708-2, and nodes 710-1 through 710-4. Services blades 706-1 and 706-2 and NASs 708-1 and 708-2 may provide services to networks 102.

Each of nodes 710-1 through 710-4 is attached to partner router 702 on one end and to provider router 704 on the other end. In this implementation, partner router 702 and provider router 704 may belong to, for example, network 102-11 and network 102-12, respectively.

Because four nodes 710-1 through 710-4 connect partnership router 702 and provider router 704, the failure of any of the links between routers 702 and 704 accounts for only ¼ the full link capacity between routers 702 and 704. In a traditional, redundancy model, a link failure would cause 50% of the bandwidth to be lost.

In FIG. 7, intelligent network interconnect 104 may allocate router, appliance, and services ports, to closely match peak load on the links between partner router 702 and provider router 704. This improves routing efficiency, and more than offsets the cost of using intelligent network interconnect 104. Depending on the implementation, intelligent network interconnect 104 ports can be inside or outside of intelligent network interconnect 104 (e.g., providing LAN services within the network boundary or outside of the network perimeter).

Figure 8:
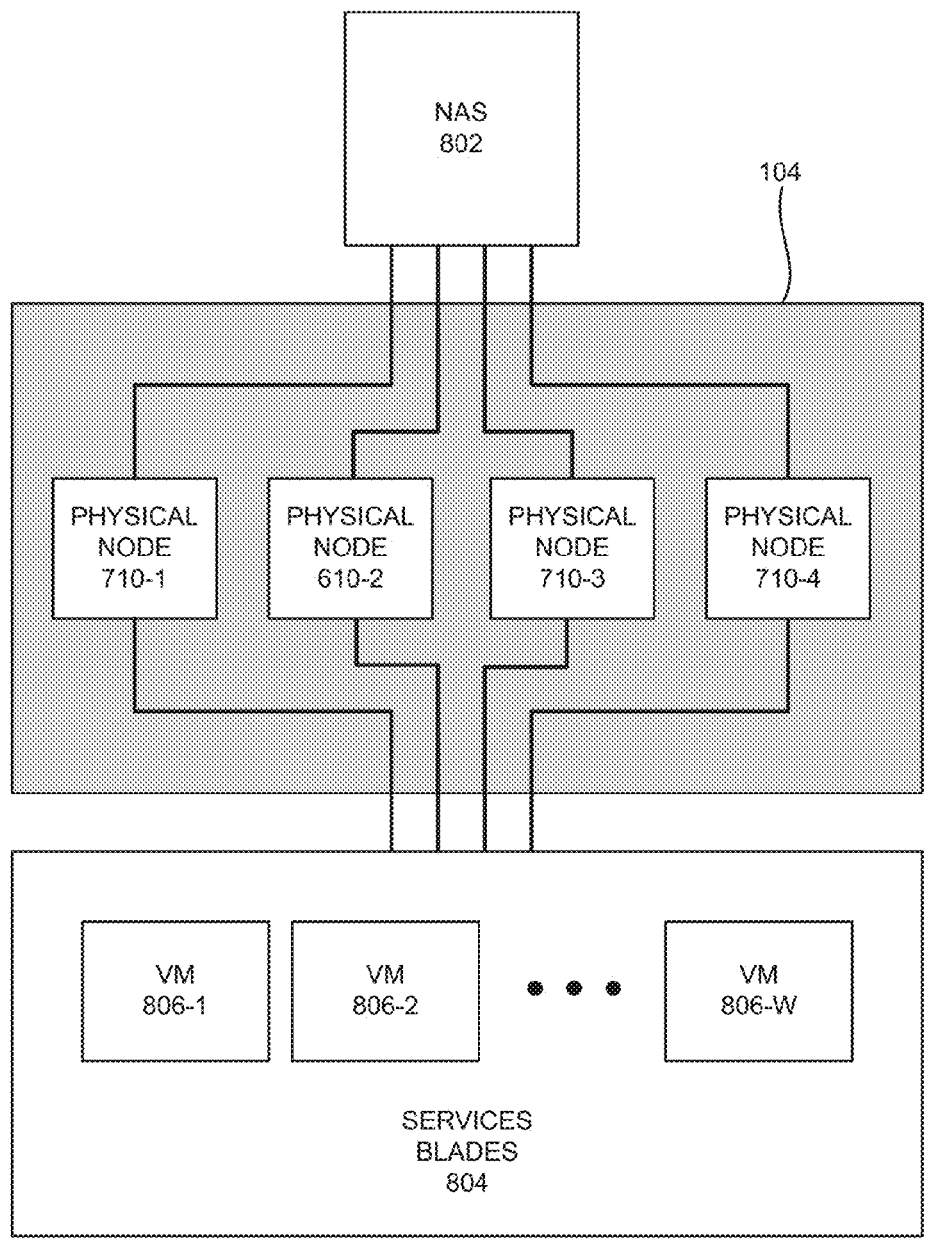
FIG. 8 illustrates leveraging the exemplary redundancy scheme of FIG. 7.

FIG. 8 illustrates leveraging the redundancy scheme of FIG. 7 for LAN services. As shown, intelligent network interconnect 104 includes nodes 710-1 though 710-4, NAS 802, and services blades 804. Although NAS 802 and services blades 804 are illustrated as existing outside of intelligent network interconnect 104, in other implementations, NAS 802 or services blades 804 may be within intelligent network interconnect 104.

In the example of FIG. 8, services blades 802 include virtual machines (VMs) 806-1 through 806-W (collectively referred to as "VMs 806" and generically as "VM 806"). Each of VMs 806 may provide services to other devices in network 100. NAS 802 provides storage space to VMs 806.

In FIG. 8, if any one of physical nodes 710-1 through 710-4 fails, only ¼ of the total, normal bandwidth between services blades 804 and NAS 802 would be affected. Intelligent network interconnect 104 may dynamically modify the bandwidth between NAS 802 and services blades 806, depending on peak traffic, time of the day (or week, month, etc.), etc. This may be done by attaching and/or detaching ports on one of physical nodes 710 to NAS 802 and/or services blades 804. The unattached nodes 710 may then be used to create a path between other devices in networks 102.

Figure 9:
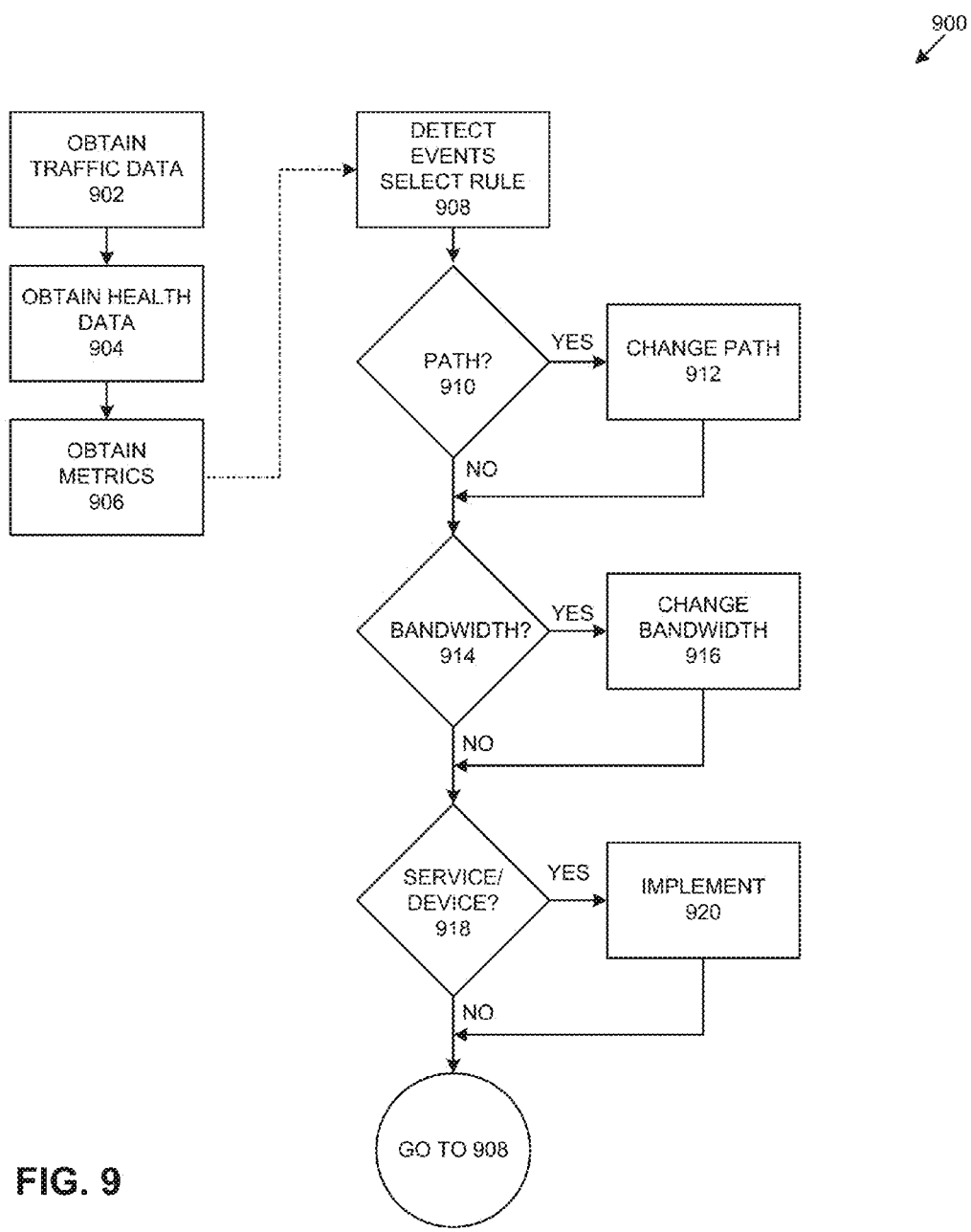
FIG. 9 is a flow diagram of an exemplary process that is associated with changing a configuration of an intelligent network interconnect of FIG. 1.

FIG. 9 is a flow diagram of an exemplary process 900 associated with changing a configuration of intelligent network interconnect 104. In some implementations, intelligent network interconnect 104 or its components (e.g., components or subsystems 401-428) may perform process 900. In some implementations, intelligent network interconnect 104 may perform actions at blocks 902-906 in a thread or process different from thread(s)/process in which the actions at blocks 908-030 are performed. In other implementations, intelligent network interconnect 104 may perform one or more of the actions in blocks 902-920 as part of a workflow.

As shown, process 900 may include obtaining traffic data, usage data, network statistics, etc. by intelligent network interconnect 104 (block 902). Intelligent network interconnect 104 may also obtain health data (e.g., heartbeats, which device has failed, which storage device is close to being full, etc.) (block 904).

Based on the obtained traffic data, usage data, network statistics, and health data, intelligent network interconnect 104 may calculate network metrics (block 906). The metrics may include, for example, overall bandwidth utilization at ingress ports for a given network, amount of traffic of a specific type (e.g., NTP packets, SNMP packets, etc.), a period of time over which the traffic increase is detected, etc.

Intelligent network interconnect 104 may use the metrics to detect one or more events or conditions defined in policies in policy tables 404 or adaptation rules tables 408 (block 908). For example, an event may be defined as a condition in which the traffic from network 102-11 to network 102-22 increases from 200 Kbps to over 100 Gbps within two minutes. In one implementation, the event may include an NTP DDoS attack, SNMP DDoS attack, natural disaster, migration of external services, requests for streaming content or another type of service, etc. Detecting the event may result in selecting (by intelligent network interconnect 104) a rule(s) whose condition matches the event.

For blocks 910-920, assume that intelligent network interconnect 104 has selected a rule based on the event detected at block 908. The selected rule may require intelligent network interconnect 104 to determine whether changing a path, through intelligent network interconnect 104, that interconnects one network (e.g., partner network) to another network (e.g., provider network) needs to be changed (block 910). Returning to the example above, intelligent network interconnect 104 may determine whether the event can be handled by changing the network path.

If intelligent network interconnect 104 determines that a change is needed (block 910: yes), then intelligent network interconnect 104 may change the path (e.g., change a path illustrated in FIG. 5 to a path in FIG. 6) (block 912). Changing the path may include switching (automatically) physical connections of cables/wires/signal paths to the network interfaces of devices in networks 102, as well as re-routing at higher network layers (e.g., changing routing tables). Thereafter, intelligent network interconnect 104 may proceed to block 914. Returning to block 910, if intelligent network device 104 determines that a change in path is not needed (block 910: no), intelligent network interconnect 104 may proceed to block 914, without performing acts that are associated with block 912.

Intelligent network interconnect 104 may determine whether to change the bandwidth of the links between networks 102 (block 914). If intelligent network interconnect 104 determines that the bandwidth of the links needs to be changed (block 914: yes), intelligent network interconnect 104 may change the bandwidths of the links, but without changing any of the paths (block 916) and proceed to block 918. For example, the devices on the paths between the networks may throttle the traffic, until the bandwidth use is below a prescribed threshold. If intelligent network interconnect 104 determines that bandwidth does not needs to be changed (block 914: no), intelligent network interconnect 104 may proceed to block 918.

Intelligent network interconnect 104 may determine whether to implement a service(s) (block 918). Whether intelligent network interconnect 104 determines to implement a service may depend on several factors, such as, for example, the suspected cause of the vent (e.g., a DDoS attack). More specifically, if intelligent network interconnect 104 determines that the increase in traffic is due to an NTP attack, intelligent network interconnect 104 may create an NTP proxy, to examine contents of NTP packets, and possibly to drop them. If intelligent network interconnect 104 determines that there is a need to implement a service (block 918), intelligent network interconnect 104 may implement the service for a specified time interval (i.e., dismantle the service after the time interval).

In some instances, intelligent network interconnect 104 may implement a service by first creating a virtual machine that hosts an application for rendering the service. In a different implementation, intelligent network interconnect 104 may implement the service by first provisioning a physical device, installing the application for the service, and starting up the application. Returning to block 928, if intelligent network interconnect 104 determines that there is no need to implement a service, intelligent network interconnect 104 may return to block 908.

Figure 10:
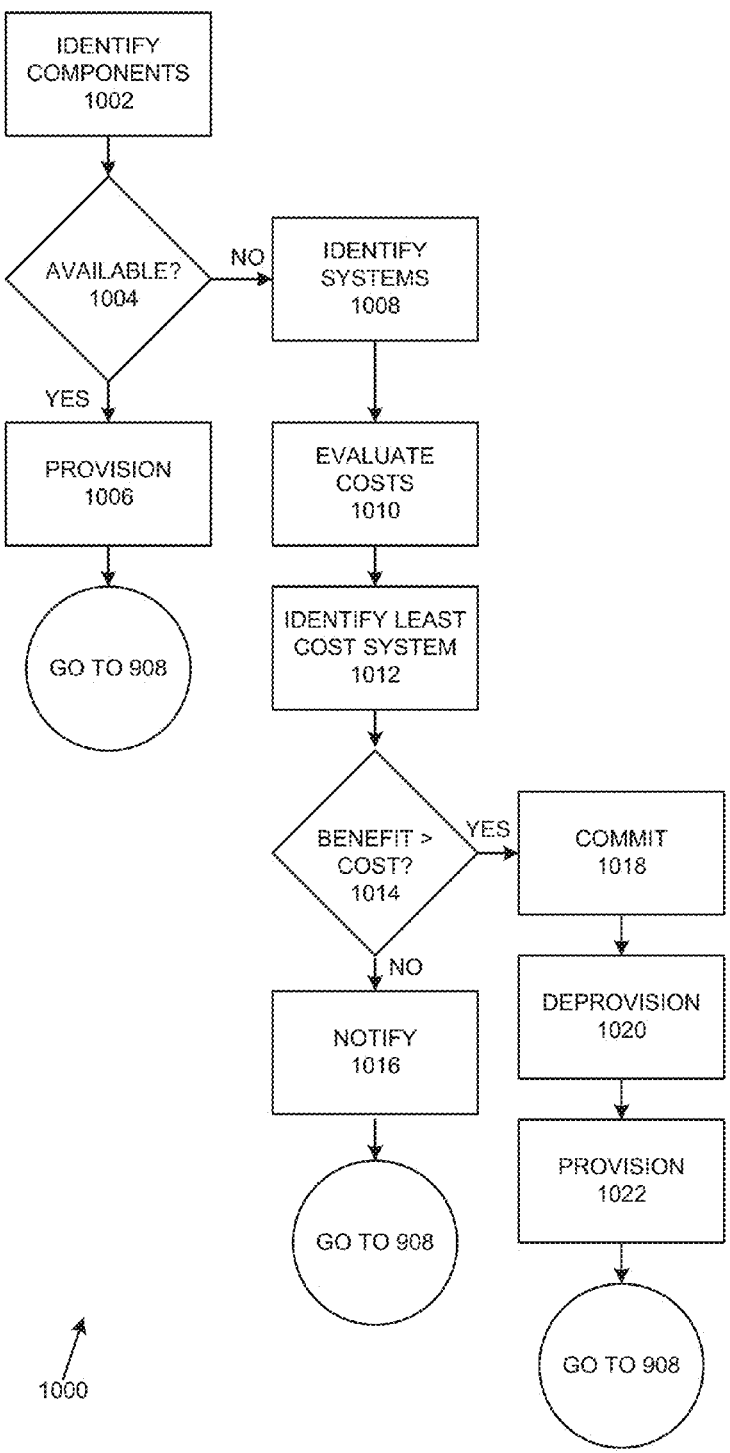
FIG. 10 is a flow diagram of an exemplary process that is associated with implementing a service.

FIG. 10 is a flow diagram of an exemplary process 1000 that is associated with implementing a service (e.g., at block 920 in FIG. 9). As shown, process 1000 may include intelligent network interconnect 104 identifying software and/or hardware components (i.e., resources) needed for rendering a first service (block 1002). The identified components may include, for example, a virtual machine, an IP address that may be allocated from a pool of IP addresses, an application for rendering the service, storage space (e.g., on NAS), a network interface, the number of CPUs, etc.

Intelligent network interconnect 104 may determine whether the components/resources are available (e.g., resources not dedicated to another service and are within intelligent network interconnect 104) (block 1002). For example, intelligent network interface interconnect 104 may determine that it needs to provision a VM, but that the storage space for provisioning the VM is not available. If intelligent network interconnect 104 determines that the resources are available (block 1004: yes), intelligent network interconnect 104 may provision the first service using the available resources (block 1006). Thereafter, intelligent network interconnect 104 may return to block 908. If intelligent network interconnect 104 determines that the resources are not available (e.g., the resources needed to provide the service are tied up to provision another service) (block 1004: no), intelligent network interconnect 104 may identify assets (services or devices) each of which uses resources that could be re-allocated to fully provide the first service (block 1008).

For each of the identified services/assets, intelligent network interconnect 104 may evaluate the cost of de-provisioning the identified service (block 1010). The cost may be measured in terms of discontinuation or degradation of the service (e.g., dollar cost associated with the degradation or discontinuation; bit error rate; average delay/jitter; etc.).

Intelligent network interconnect 104 may identify the service (among the services identified at block 1008) with the least cost (block 1012). Furthermore, intelligent network interconnect 104 may estimate the benefit of provisioning the first service and compare the benefit to the least cost (block 1014). If the benefit is less than the cost, intelligent network interconnect 104 may notify an administrator application or a client that intelligent network interconnect 104 has not been able to find sufficient resources to provision the first service (block 1016). Thereafter, intelligent network interconnect 104 may return to block 908.

If intelligent network interconnect 104 determines that the benefit is greater than the least cost (block 1014: yes), intelligent network interconnect 104 may commit the resources of the least cost service for the first service (block 1018). Committing the resources may entail, for example, recording, in a database, that the components/resources of the least cost service is to be used to provision the first service. Once committed, no other process may use the components/resources of the least cost service to provision a service different from the first service.

Intelligent network interconnect 104 may de-provision the least cost service (block 1020). De-provisioning the least cost service may include stopping the application(s) rendering the least cost service, de-allocating resources/components for the service, etc. Accordingly, the resources and/or components of the least cost service may be returned to the available pool of resources that may be used to provision the first service. In addition, intelligent network interconnect 104 may send notifications to appropriate parties (e.g., an administrator or a user whose network may be affected by the de-provisioning and discontinuation of the service).

Intelligent network interconnect 104 may provision the first service (block 1022) and notify the appropriate administrator or the user. As discussed above, in provisioning the first service, intelligent network interconnect 104 may record the allocation of the components via inventory manager 412.

This specification describes intelligent network ininterconnect 104 between networks 102 and/or elements of networks 104. Itelligent network interconnect 104 may provision services between partnership networks and/or allow services and service segments to dynamically migrate within intelligent network interconnect 104, to avoid stranded network assets and perfomrance impacts.

In this specification, various preferred embodiments have been described with reference to the accompanying drawings. It will be evident that modifications and changes may be made thereto, and additional embodiments may be implemented, without departing from the broader scope of the invention as set forth in the claims that follow. The specification and drawings are accordingly to be regarded in an illustrative rather than restrictive sense.

In the above, while a series of blocks have been described with regard to the processes illustrated in FIGS. 9 and 10, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store or employ personal information provided by individuals, it should be understood that such information shall be used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a", "an" and "the" are intended to include one or more items. Further, the phrase "based on" is intended to mean "based, at least in part, on" unless explicitly stated otherwise.

What is claimed is:

1. An intelligent network interconnect, comprising:
    a plurality of nodes, wherein the plurality of nodes include a first node coupled to a first network and a second node coupled to a second network, and wherein each node of the plurality of nodes is coupled to a control channel; and
    a control device coupled to the control channel and configured to:
        collect network data from the first node and the second node, wherein the network data includes traffic data of the first network;
        obtain metrics based on the collected network data;
        detect an event based on the metrics and the collected network data;
        perform, based on the event, a lookup in a database, wherein the database stores a plurality of events and one or more rules corresponding to each event of the plurality of events, and wherein the one or more rules include rules associated with changing interconnectivity of nodes of the plurality of nodes, rules associated with modifying a bandwidth of links between the nodes, and rules associated with provisioning services or devices;

identify, based on performing the lookup, a plurality of rules whose conditions match the event;

perform a second lookup in a second database to select a rule, of the plurality of rules, to apply, wherein the second database stores information regarding rules to select based on network conditions and policies, received from a user, regarding which rules to apply based on which network is affected by each rule; and send a command over the control channel, to one or more of the plurality of nodes, to perform an action associated with the rule, wherein the action includes at least one of:
  changing the interconnectivity of the nodes; or
  provisioning a service or a device,
wherein the first network is different from the second network.

2. The intelligent network interconnect of claim 1, wherein the control channel includes:
an out-of-band channel.

3. The intelligent network interconnect of claim 1, wherein the plurality of nodes include at least one of:
a router or a switch.

4. The intelligent network interconnect of claim 1, wherein the event includes:
a distributed denial-of-service attack.

5. The intelligent network interconnect of claim 4, wherein the distributed denial-of-service attack includes one of:
a network time protocol (NTP) attack; or
a simple network management protocol (SNMP) attack.

6. The intelligent network interconnect of claim 1, wherein the control device is further configured to:
collect health data from the plurality of nodes, wherein the health data indicates whether each of the plurality of nodes is operating correctly.

7. The intelligent network interconnect of claim 1, wherein the plurality of nodes include:
one or more clusters, wherein each cluster includes at least two nodes that are connected to one another via a heartbeat network.

8. The intelligent network interconnect of claim 1, wherein the changing the interconnectivity of the nodes includes:
shunting traffic from the first network to the second network.

9. The intelligent network interconnect of claim 1, wherein the provisioning the service includes:
creating a virtual machine on one of the plurality of nodes.

10. The intelligent network interconnect of claim 1, wherein the control device is further configured to:
receive the one or more rules, which include the rule, from a remote device; and
store the one or more rules in the database.

11. The intelligent network interconnect of claim 1, wherein the changing the interconnectivity of the nodes includes:
physically disconnecting the first node from the first network.

12. A method comprising:
collecting network data from a first node coupled to a first network and a second node coupled to a second network, wherein the network data includes traffic data of the first network;
obtaining metrics based on the collected network data;
detecting an event based on the metrics and the collected network data;

performing, based on the event, a lookup in a database, wherein the database stores a plurality of events and one or more rules corresponding to each event of the plurality of events and wherein the one or more rules include rules associated with changing interconnectivity of nodes, rules associated with modifying a bandwidth of links between the nodes, and rules associated with provisioning services or devices;

identifying, based on performing the lookup, a plurality of rules whose conditions match the event;

performing a second lookup in a second database to select a rule, of the plurality of rules, to apply, wherein the second database stores information regarding rules to select based on network conditions and policies, received from a user, regarding which rules to apply based on which network is affected by each rule; and sending a command over a control channel to one or more nodes to at least one of:
  change the interconnectivity of the one or more nodes; or
  provision a service or a device,
wherein the first network is not the second network,
wherein the one or more nodes are included in a plurality of nodes that include the first node and the second node, and
wherein each of the plurality of nodes is coupled to the control channel.

13. The method of claim 12, wherein the control channel includes an in-band channel.

14. The method of claim 12, wherein the plurality of nodes include at least one of:
an appliance, a firewall, or an application server.

15. The method of claim 12, wherein the event includes:
a migration of a service provided by one or more remote devices not included in the plurality of nodes.

16. The method of claim 12, further comprising:
collecting health data from the plurality of nodes;
determining that one of the plurality of nodes has failed based on the health data; and
replacing the failed node with one of healthy nodes among the plurality of nodes.

17. The method of claim 12, wherein changing the interconnectivity includes:
shunting traffic from the first network to the second network.

18. The method of claim 12, wherein provisioning the service includes:
creating a virtual machine on one of the plurality of nodes.

19. A computer-readable device comprising one or more computer-executable instructions that, when executed by at least one processor, cause the at least one processor to:
collect network data from a first node coupled to a first network and a second node coupled to a second network, wherein the network data includes traffic data of the first network;
obtain metrics based on the collected network data;
detect an event based on the metrics and the collected network data;
perform, based on the event, a lookup in a database, wherein the database stores a plurality of events and one or more rules corresponding to each event of the plurality of events, and wherein the one or more rules include rules associated with changing interconnectivity of nodes, rules associated with modifying a bandwidth of links between the nodes, and rules associated with provisioning services or devices;

identify, based on performing the lookup, a plurality of rules whose conditions match the event;

perform a second lookup in a second database to select a rule, of the plurality of rules, to apply, wherein the second database stores information regarding rules to select based on network conditions and policies, received from a user, regarding which rules to apply based on which network is affected by each rule; and send a command over a control channel to one or more nodes to at least one of:

change the interconnectivity of the one or more nodes, or provision a service or a device, wherein the first network is not the second network, wherein the one or more nodes are included in a plurality of nodes that include the first node and the second node, and wherein each of the plurality of nodes is coupled to the control channel.

20. The computer-readable device of claim 19, wherein the event includes:

a distributed denial-of-service attack.

\* \* \* \* \*